April 21, 1970 — L. JACHIMOWICZ — 3,507,978
SHEATHED ELECTRICAL CABLE
Filed Dec. 11, 1967

HIGH DENSITY POLYETHYLENE
POLYETHYLENE COPOLYMER
ALUMINUM
POLYETHYLENE COPOLYMER

INVENTOR
LUDWIK JACHIMOWICZ
BY Sandoe, Neill, Schotller & Wilhoten
ATTORNEYS.

United States Patent Office 3,507,978
Patented Apr. 21, 1970

---

3,507,978
SHEATHED ELECTRICAL CABLE
Ludwik Jachimowicz, Elizabeth, N.J., assignor to General Cable Corporation, New York, N.Y., a corporation of New Jersey
Filed Dec. 11, 1967, Ser. No. 689,372
Int. Cl. H01b 7/18
U.S. Cl. 174—105                                    12 Claims

ABSTRACT OF THE DISCLOSURE

This specification discloses an electric cable, particularly cable for telephone service, in which a core of individually insulated conductors is enclosed within a flexible metal foil sheath which is coated on both sides with polyolefin insulation. The outer coating or layer of insulation on the metal foil is composite and has an outer laminate of higher melting point than the inner laminate which is bonded to the metal foil. Edge portions of the coated metal sheath along a longitudinal seam are disposed in parallel relation to one another and joined by a double seam, or graduated seam, which is made by fusing confronting inner coatings of the insulation with part of the coating extruded over the edges of the metal sheath so that there is no exposed edge of the metal. The outer portion of the seam has a lower dielectric strength for localizing the path of lightning in the event that the cable is struck by lightning.

CROSS REFERENCE TO RELATED PATENT

The electric cable of this invention is an improvement on that disclosed in my Patent No. 3,206,541, issued Sept. 14, 1965.

BACKGROUND AND SUMMARY OF THE INVENTION

The manufacture of the sheathed electric cable disclosed in Patent No. 3,206,541 presented the disadvantage that when a jacket was extruded over the insulation coated foil the outer layer of copolymer insulation on the foil sometimes melted. A non-uniform coating of the foil resulted. Also the sealing of the tabs the melting of the outer layer of insulation resulted in a tendency to stick to the rollers unless careful precautions were taken in the rolling operation. Moreover, the mechanical strength of the tabs was low, so that they would sometime break under the pull of the seamsealing tools.

The present invention provides a layer of insulation of composite construction on the outer surface of the metal foil. Preferably the foil will be aluminum. The same copolymer insulation can be chemically bonded to the outside surface of the metal foil as to the inner surface and then a layer of high-density polyethylene, or equivalent insulating material of higher melting point than the copolymer, is heat fusion-bonded to the outside surface of the copolymer.

This invention includes other improvements on the construction of Patent No. 3,206,541. One of these is the extrusion of insulation from the confronting faces of upstanding longitudinal seam edges of the insulated aluminum foil to cover the edges of the foil so that in the finished core, there is no exposed metal.

Another embodiment relates to the construction of the seam between the outwardly extending edges, or tabs, of the insulated aluminum foil. This seam, which is later bent over against the circumferential extent of the insulated foil, consists of a double seam, or graduated seam, which has reduced dielectric strength along the portion of the seam which is remote form the insulated conductors of the core. This protects the cable in the event that it is struck by lightning, as will be explained more fully in the description of the preferred embodiment.

Other objects, features and advantages of the invention will appear or be pointed out as the description proceeds.

BRIEF DECRIPTION OF THE DRAWING

In the drawings forming a part hereof, in which like reference characters indicate corresponding parts in all the views.

Figure 1:
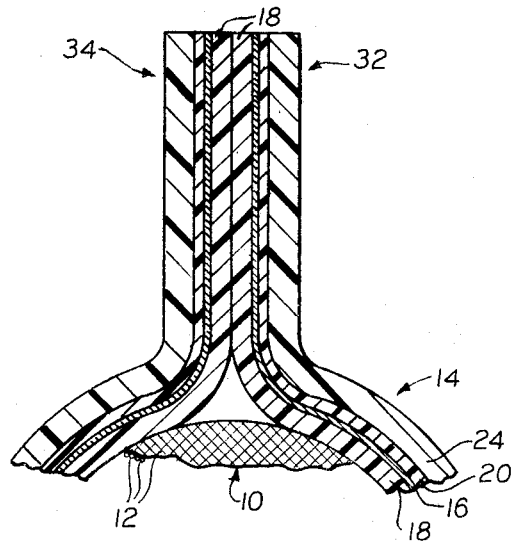
FIGURE 1 is a fragmentary, transverse, sectional view through a cable core with the edges of a longitudinally folded, insulation coated, metal foil bent upwardly and confronting one another along the seam of the strip, before the edges or tabs are connected together.
Figure 2:
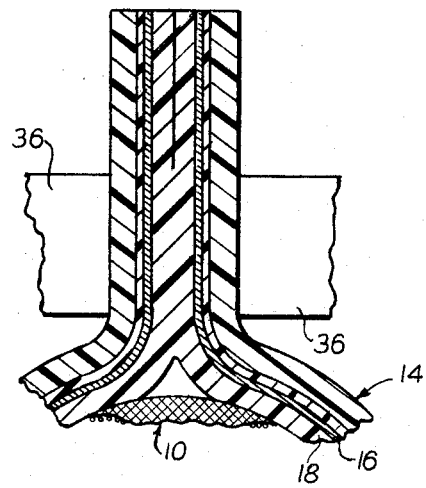
FIGURE 2 shows the same construction as FIGURE 1 but with the same edges bonded together at the region closest to the conductors of the core; i.e., at the lower part of the seam as shown in FIGURE 2.
Figure 3:
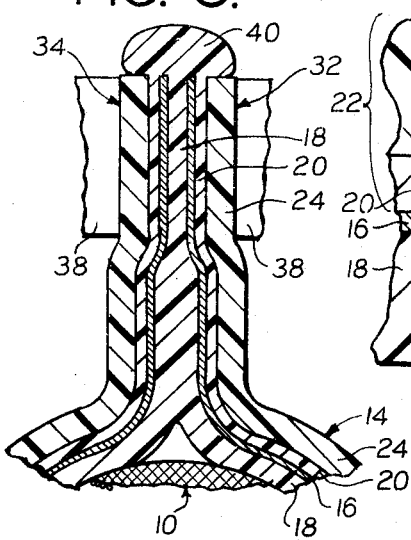
FIGURE 3 shows the same construction as FIGURES 1 and 2 after a second seaming operation which extrudes material of the inner insulating layer out over the edges of the aluminum foil and into fusing contact with the inner laminate of the insulation on the outside of the aluminum foil, this figure showing the double seam with reduced dielectric strength at the outer part of the seam.
Figure 4:
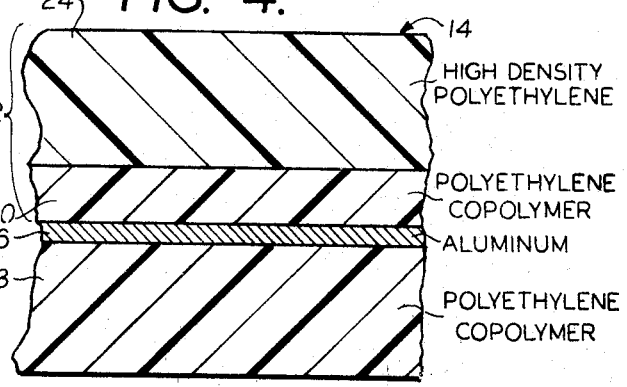
Figure 5:
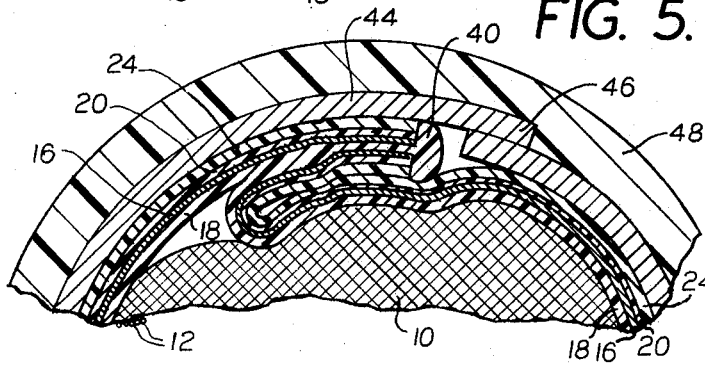

FIGURE 4 is a greatly enlarged sectional view through the insulation coated aluminum foil which is folded about the cable core to make the constructions shown in FIGURES 1– 3; and FIGURE 5 is a transverse sectional view through a finished cable having the core of FIGURE 3 with its seam bent over against a circumferential portion of the folded, insulated metal foil, and with a longitudinally folded outer corrugated aluminum strip, and an overlying extruded plastic jacket characteristic of Alpeth cable.

DESCRIPTION OF THE PREFERRED EMBODIMENT

FIGURE 1 shows a portion 10 of the cable core which is made up of individually insulated conductors 12 stranded and wrapped in a conventional manner and over which a metal sheath is applied. An insulated, i.e. insulation coated, metal foil strip 14 is folded longitudinally around the inner core portion 10 and this composite strip 14 forms the inner sheath over the cable core that is the subject of the present invention.

The preferred construction of the strip 14 is shown in FIGURE 4. It includes a liquid and vapor-impervious metal foil 16, preferably made of aluminum between .3 and 1.0 mil in thickness. In the construction illustrated, the aluminum foil 16 has a thickness of .7 mil. There is a copolymer insulating layer 18 on the underside of the aluminum foil 16. The layer 18 is preferably chemically bonded to the aluminum foil and is made of low-density polyethylene modified by monomers containing reactive carboxyl groups which give the desired bonding characteristics. Other polyolefin insulation can be used. The thickness of the layer 18 is preferably between 5 and 10 mils. The layer 18 constitutes the inner insulating layer when the strip 14 is longitudinally folded around the inner portion or core of the cable.

Another insulating layer 20, which is preferably of the same material as the insulating layer 18, is bonded to the upper or outside surface of the aluminum foil 16, also preferably by chemical bonding. This insulation layer 20 is preferably between 2 and 4 mils in thickness.

The outer insulation on the aluminum foil 16, designated by the reference character 22 in FIGURE 4, includes not only the insulation layer 20, but also another insulation layer 24, which is a polyolefin of higher melting point than the insulation layer 20, preferably high-density polyethylene having a thickness of from 4 to 6 mils.

The width of the composite strip 14 is somewhat greater than the circumference of the inner portion 10 of the core so that when the strip 14 is folded longitudinally over the inner portion 10, the edge portions 32 and 34 of the strip can be bent upward and outward to form parallel confronting tabs or seam edges, as shown in FIGURE 1. The seam formed by the edge portions 32 and 34 is preferably a longitudinal seam.

The folding of the strip 14 around the inner portion 10 of the core and the upward bending of the edge portions 32 and 34 into the relation shown in FIGURE 1, can be accomplished in various ways, including the method disclosed in my Patent 3,206,541, previously referred to.

The first step in obtaining the improved seam of this invention is illustrated in FIGURE 2. Heat is applied to the portions of the seam edges 32 and 34, which are closest to the inner core portion 10, by heaters 36. This heat is sufficient to fuse the confronting faces of the inner layers 18 to one another; and FIGURE 2 shows the inner insulation as being fused to a one-piece construction. The heaters 36 do not fuse the outer laminate 24 which has a higher melting point than the inner layers 18 and 20. The heat is applied with moderate pressure so that substantially no insulation is squeezed out from between the confronting edge portions of the aluminum foil 16 at the region between the heaters 36.

The next step in the making of the improved seam of this invention is illustrated in FIGURE 3. Heaters 38 apply both heat and pressure to the upper or outer parts of the edge portions 32 and 34. The outer laminate 24 is not fused, but the inner insulation 18 and 20 is melted and sufficient pressure is applied to push the edge portions of the aluminum between the heaters 38 closer together while maintaining them in substantially parallel relation. This displacement of the aluminum foil extrudes a bead 40 of insulating material from the space between the edge portions of the aluminum foil, and to a lesser extent from between the aluminum foil and the outer laminate 24. The bead 40 fuses the insulating layers 18 and 20 together across the edges of the aluminum foil 16 and provides a protective layer of plastic over the aluminum so that there is no metal exposed in the final seam.

It will be apparent from FIGURE 3 that the double seam between the edge portions 32 and 34 has less dielectric strength in reference to the cable sheath 44 along its bead portion 40 than it has along the major portion of the surface of the aluminum foil which encloses the cable core and is covered by layers 24 and 20. At the bead 40 the cut edges of the foil 16 are well exposed to breakdown of the insulation in case of potential difference between foil 16 and cable shield 46. The edges do not have benefit of insulation layer 24 and even the insulation layer 20 has been thinned by extrusion. A similar result can be obtained by forming a graduated seam in place of the double seam, shown in FIGURE 5. In a graduated seam, the confronting faces of the edge portions of the aluminum strip diverge from one another along at least a portion of their radial extent as they extend toward the inner portion 10 of the core.

In the event that the cable is struck by lightning, and the lightning voltage in the cable shield 44, which is substantially thicker than the metal foil 16, increases sufficiently, the lightning voltages will tend to break down the insulation between the shield 44 and the aluminum foil 16, and then from this foil to the conductors of cable core 10. The breakdown path from cable shield to the foil is a weak dielectric, and sharp edges of foil 16 are embedded in the bead 40. Thus, the breakdown occurs at the outer edge of the seam portion of bead 40. In this manner there will be no puncture through layers 20 and 24, which protect the vapor impervious foil barrier 16 and there will be no degradation of the quality of the vapor barrier in this invention.

Experiments conducted with this invention and using lightning surges of 5 kv. have confined this operation of the invention. Even when the jacket was immersed in oil and the voltage electrode was placed diametrically opposite the seam, the breakdown never occurred through the body of the jacket. The current alway tracked along the surface of the jacket and struck into the edges of the sealed seam in the manner intended.

Once the spark between the cable shield 44 and the foil 16 has occurred, the foil will be at the potential of the lighting voltage, which will endeavor to break down the insulation between the foil 16 and the conductors of the cable core 10. This insulation is made to withstand at least 20 kv. DC on PIC cables and 10 kv. DC on paper insulated cables. The contribution to this dielectric strength for insulating layer 18 is very substantial. The layer 18 has undiminished wall thickness around the cable care 10. This insulation is made to withstand at The metal of the foil is smooth, the sharp edges of the foil having been brought out beyond the second seam made by the rollers 32–34. Therefore the foil envelope presents to the cable core 10 a smooth surface which improves the dielectric strength of the layer 18, so that this layer alone when made 5 mils thick can withstand test at 12 kv. DC for 3 seconds.

FIGURE 5 shows the way in which the double seamed edge of FIGURE 3 is bent over to lie against a circumferentially extending portion of the folded strip 14. In the construction illustrated, by FIGURE 5, the core consisting of the inner core portion 10 and the folded composite strip 14, which forms the outer portion of the core, is enclosed in a jacket which includes a corrugated metal, preferably aluminum, strip 44 having a longitudinally extending lap seam 46. This transversely corrugated aluminum strip 44 is covered with an outer plastic jacket 48. The lap seam 46 is not welded or soldered, and the outer jacket 48 is extruded over the metal strip 44, in the Alpeth cable constructions.

It will be understood, however, that this invention can also be used for making inner vapor impervious jackets for Stalpeth cable constructions where the cable core covered by the inner jacket of the present invention is enclosed within a longitudinally folded, corrugated aluminum strip enclosed within a corrugated steel strip which is longitudinally folded and soldered or welded along its seam. The Stalpeth construction also has an outer plastic jacket extruded over the corrugated steel strip for protecting the steel from moisture.

The preferred embodiment of the invention has been illustrated and described, but changes and modifications can be made and some features can be used in different combinations without departing from the invention as defined in the clams.

What is claimed is:

1. An electric cable including a core portion having a plurality of insulated conductors, a sheath longitudinally folded around the core portion of the cable and including a metal foil with outwardly bent confronting edge portions along an axially extending seam of the sheath, the sheath having electric insulation bonded to opposite sides of the metal foil, the insulation on one side of the foil extending around the edges thereof and being a one piece, homogenous extension of the insulation on the other side of the foil whereby the entire surface of the metal foil is encapsulated.

2. An electric cable including a core portion having a plurality of insulated conductors, a sheath longitudinally folded around the core portion of the cable and including a metal foil with outwardly bent confronting edge portions along an axially extending seam of the sheath, the sheath having electric insulation bonded to opposite sides of the metal foil, the insulation on one side of the foil extending around the edges thereof and uniting with the insulation on the other side of the foil whereby the entire surface of the metal foil is encapsulated, characterized by the outer insulation on the metallic foil being composite and having an inner laminate chemically bonded to the metallic foil and an outer laminate of higher melting point than the inner laminate and fusion bonded to the inner laminate.

3. The electric cable described in claim 2 characterized by the insulation in contact with both sides of the metallic foil being made of the same material and being a copolymer including polyethylene.

4. The electric cable described in claim 3 characterized by the outer laminate being high density polyethylene and the metal foil being aluminum.

5. An electric cable including a core portion having a plurality of insulated conductors, a sheath longitudinally folded around the core portion of the cable and including a metal foil with outwardly bent confronting edge portions along an axially extending seam of the sheath, the sheath having electric insulation bonded to opposite sides of the metal foil, the insulation on one side of the foil extending around the edges thereof and uniting with the insulation on the other side of the foil whereby the entire surface of the metal foil is encapsulated, characterized by a metal shield enclosing the sheath and characterized by the dielectric strength between the conductors of the cable core and the metal foil, and between the foil and the shield, around the cable core, being higher than the dielectric strength between the edges of the foil and the shield, whereby lightning damage by discharging between the metal foil and the shield will occur at the edges of the metal foil.

6. The electric cable described in claim 5 characterized by the metal foil being aluminum foil 0.3–1.0 mil thick, the insulation on one side of the metal foil being a polyethylene copolymer 5–10 mils thick, the insulation on the other side of the metal foil being a composite layer with an inner laminate of polyethylene copolymer 2–4 mils thick and an outer laminate of high density polyethylene of higher melting point than the inner laminate and fusion bonded to the inner laminate, the outer laminate being 4–6 mils in thickness.

7. An electric cable comprising an inner core portion and a sheath surrounding said core portion and comprising a metal foil folded about the core portion, the foil having layers of polyolefin copolymer insulation bonded to both sides of the metal foil and united with each other around the edges of the foil, and an outer high density laminate of electric insulation heat fused to the copolymer layer on one side of the metal foil and of higher melting point than the copolymer to which it is heat fused.

8. The electric cable described in claim 7 characterized by the copolymer layers being copolymers of polyethylene modified by monomers containing reactive carboxyl groups having the desired bonding characteristics for chemically bonding the copolymer layers of the metal foil.

9. The electric cable described in claim 7 characterized by the metal foil being aluminum foil 0.3–1.0 mil thick, the copolymer on one side of the metal foil being 5–10 mils thick, the insulation on the other side of the metal foil having the inner laminate of polyethylene copolymer 2–4 mils thick and an outer laminate of high density polyethylene of 4–6 mils in thickness.

10. An electric cable having a core portion surrounded by a sheath that includes an insulated metal foil longitudinally folded around the core portion and with the edge regions at opposite sides of the metal foil bent outwardly to form tabs having faces in positions to confront one another along a longitudinal seam of the sheath, the metal foil having electric insulation bonded to both sides thereof and around the edges of the foil at the tabs, the insulation on the confronting faces of the tabs being bonded together, and the dielectric strength of the insulation in the region of the edges of the foil being less than the dielectric strength of the insulation on the outer surface of the foil around the core.

11. An electric cable including a core portion having a plurality of insulated conductors, a sheath enclosing the said core portion, the sheath comprising a metal foil with an insulating coating on at least its outer surface folded longitudinally about the core into a smoothly rounded covering with a sealed seam portion, and an insulated conducting tab electrically continuous with the foil extending along the sheath and projecting outwardly beyond the smoothly rounded covering, the insulation of the outer edge of the tab portion having a lower dielectric strength than that of the smoothly rounded portion of the sheath, whereby damage resulting from lightning discharge to the sheath will occur along the outer edge of the tab without damage to the sealed covering around the cable core.

12. The electric cable described in claim 11 characterized by the sheath having an outer portion which is a metal strip substantially thicker than the foil and which surrounds the insulation of the metal foil to provide mechanical protection and a primary lightning shield.

References Cited

UNITED STATES PATENTS

| 3,206,541 | 9/1965 | Jachimowicz | 174—105 |
| 3,321,572 | 5/1967 | Garner | 174—105 |

LARAMIE E. ASKIN, Primary Examiner

A. T. GRIMLEY, Assistant Examiner

U.S. Cl. X.R.

174—107, 110

UNITED STATES PATENT OFFICE
CERTIFICATE OF CORRECTION

Patent No. 3,507,978            April 21, 1970

Ludwik Jachimowicz

It is certified that error appears in the above identified patent and that said Letters Patent are hereby corrected as shown below:

Column 1, line 70, "form" should read -- from --. Column 2, line 16, "same" should read -- seam --. Column 4, line 2, "confined" should read -- confirmed --; line 11, "lighting" should read -- lightning --; line 16, "for" should read -- from the --; line 18, "care" should read -- core --; line 18, "This insulation is made to withstand at" should read -- cable core 10 and into the first seam under rollers 36. --.

Signed and sealed this 22nd day of December 1970.

(SEAL)
Attest:

Edward M. Fletcher, Jr.
Attesting Officer

WILLIAM E. SCHUYLER, JR.
Commissioner of Patents